(12) United States Patent
Choi et al.

(10) Patent No.: US 11,056,710 B2
(45) Date of Patent: Jul. 6, 2021

(54) ELECTRODE ASSEMBLY FOR FLEXIBLE RECHARGEABLE BATTERY AND FLEXIBLE RECHARGEABLE BATTERY INCLUDING THE SAME

(71) Applicant: SAMSUNG SDI CO., LTD., Yongin-si (KR)

(72) Inventors: Sol Choi, Yongin-si (KR); Hyeri Eom, Yongin-si (KR); Seungjae Lee, Yongin-si (KR); Da-Un Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 23 days.

(21) Appl. No.: 16/212,322

(22) Filed: Dec. 6, 2018

(65) Prior Publication Data

US 2019/0173119 A1 Jun. 6, 2019

(30) Foreign Application Priority Data

Dec. 6, 2017 (KR) .................. 10-2017-0166909
Sep. 13, 2018 (KR) .................. 10-2018-0109692

(51) Int. Cl.

| | | |
|---|---|---|
| *H01M 10/02* | (2006.01) | |
| *H01M 2/02* | (2006.01) | |
| *H01M 2/16* | (2006.01) | |
| *H01M 2/26* | (2006.01) | |
| *H01M 2/22* | (2006.01) | |
| *H01M 2/06* | (2006.01) | |
| *H01M 2/30* | (2006.01) | |
| *H01M 2/08* | (2006.01) | |
| *H01M 4/02* | (2006.01) | |

(52) U.S. Cl.
CPC .......... *H01M 10/02* (2013.01); *H01M 2/0207* (2013.01); *H01M 2/0275* (2013.01); *H01M 2/06* (2013.01); *H01M 2/08* (2013.01); *H01M 2/1673* (2013.01); *H01M 2/22* (2013.01); *H01M 2/26* (2013.01); *H01M 2/30* (2013.01); *H01M 2004/021* (2013.01)

(58) Field of Classification Search
CPC ...... H01M 10/02; H01M 2/0207; H01M 2/22; H01M 2/06; H01M 2/30; H01M 2/08; H01M 2/0275; H01M 2/26; H01M 2/1673; H01M 2004/021
See application file for complete search history.

(56) References Cited

U.S. PATENT DOCUMENTS

| | | | |
|---|---|---|---|
| 2006/0046137 A1 | 3/2006 | Kodama | |
| 2009/0012238 A1* | 1/2009 | Endoh | ................... C08F 210/06 |
| | | | 525/240 |
| 2013/0236772 A1* | 9/2013 | Kim | ....................... H01M 4/04 |
| | | | 429/163 |
| 2013/0242772 A1 | 9/2013 | Attar et al. | |
| 2014/0193699 A1* | 7/2014 | Kim | .................. H01M 10/0431 |
| | | | 429/164 |
| 2015/0155528 A1 | 6/2015 | Takahashi et al. | |
| 2015/0340699 A1 | 11/2015 | Chami et al. | |
| 2016/0149171 A1* | 5/2016 | Suh | ...................... H01M 2/0275 |
| | | | 429/163 |
| 2016/0149221 A1* | 5/2016 | Choi | ....................... H01M 2/26 |
| | | | 429/179 |
| 2017/0194606 A1* | 7/2017 | Lim | ......................... H01M 2/02 |
| 2018/0062146 A1 | 3/2018 | Asano et al. | |

FOREIGN PATENT DOCUMENTS

| | | |
|---|---|---|
| JP | 11-307089 A | 11/1999 |
| JP | 2006-073243 A | 3/2006 |
| KR | 10-2014-0094568 A | 7/2014 |
| KR | 10-2015-0032268 A | 3/2015 |
| KR | 10-2015-0065142 A | 6/2015 |
| WO | 2016/157685 A1 | 10/2016 |

OTHER PUBLICATIONS

Korean Office Action dated Feb. 23, 2021, issued in corresponding Korean Patent Application No. 10-2018-0109692 (5 pages).

* cited by examiner

*Primary Examiner* — Muhammad S Siddiquee
(74) *Attorney, Agent, or Firm* — Lewis Roca Rothgerber Christie LLP

(57) ABSTRACT

An electrode assembly and a rechargeable battery including the same are provided. An electrode assembly for a rechargeable battery includes: a first electrode including a first coating part and a first uncoated region at at least one side of the first coating part; a second electrode including a second coating part and a second uncoated region at at least one side of the second coating part; a separator between the first electrode and the second electrode; and at least one of a first stress buffering part on at least a partial region of the first uncoated region and a second stress buffering part on at least a partial region of the second uncoated region, the at least one of the first stress buffering part and the second stress buffering part being configured as a film including an ethylene propylene copolymer, a hydrogenated hydrocarbon polymer, and polyethylene.

16 Claims, 9 Drawing Sheets

ELECTRODE ASSEMBLY FOR FLEXIBLE RECHARGEABLE BATTERY AND FLEXIBLE RECHARGEABLE BATTERY INCLUDING THE SAME

CROSS-REFERENCE TO RELATED APPLICATIONS

This application claims priority to and the benefit of Korean Patent Application Nos. 10-2017-0166909 and 10-2018-0109692, filed in the Korean Intellectual Property Office on Dec. 6, 2017 and Sep. 13, 2018, respectively, the entire contents of both of which are incorporated herein by reference.

BACKGROUND

1. Field

Aspects of embodiments of the present disclosure relate to an electrode assembly for a rechargeable battery, and a rechargeable battery including the same.

2. Description of the Related Art

A rechargeable battery, for example, is configured to include a case into which an electrode assembly, configured having a positive electrode and a negative electrode, and a separator interposed between the positive electrode and the negative electrode, is placed. Also, electrode tabs electrically connected to the positive electrode and the negative electrode are respectively drawn out to an outside of the case.

In recent years, attention has been focused on development and commercial availability of flexible electronic devices, such as flexible displays, wearable mobile phones, and watches. Therefore, there is a growing demand for realizing a flexible characteristic for a rechargeable battery, which is a power supply for such a flexible electronic device.

Particularly, studies have been actively carried out to realize a flexible rechargeable battery with excellent durability even with repeated bending.

The above information disclosed in this Background section is for enhancement of understanding of the background of the invention and, therefore, it may contain information that does not form the prior art that is already known in this country to a person of ordinary skill in the art.

SUMMARY

According to an aspect of embodiments of the present disclosure, an electrode assembly for a rechargeable battery with excellent flexibility and durability, and a rechargeable battery including the same are provided.

According to one or more exemplary embodiments of the present disclosure, an electrode assembly for a rechargeable battery includes: a first electrode including a first coating part and a first uncoated region at at least one side of the first coating part; a second electrode including a second coating part and a second uncoated region at at least one side of the second coating part; a separator between the first electrode and the second electrode; and at least one of a first stress buffering part on at least a partial region of the first uncoated region and a second stress buffering part on at least a partial region of the second uncoated region, wherein the at least one of the first stress buffering part and the second stress buffering part is configured as a film including an ethylene propylene copolymer, a hydrogenated hydrocarbon polymer, and polyethylene.

According to one or more exemplary embodiments of the present disclosure, a rechargeable battery includes the above-described electrode assembly for the rechargeable battery, and an exterior member receiving the electrode assembly for the rechargeable battery.

The electrode assembly for the rechargeable battery and the rechargeable battery including the same according to exemplary embodiments of the present disclosure may have excellent flexibility and remarkably improved durability, even in repeated bending.

DESCRIPTION OF SYMBOLS

Figure 1:
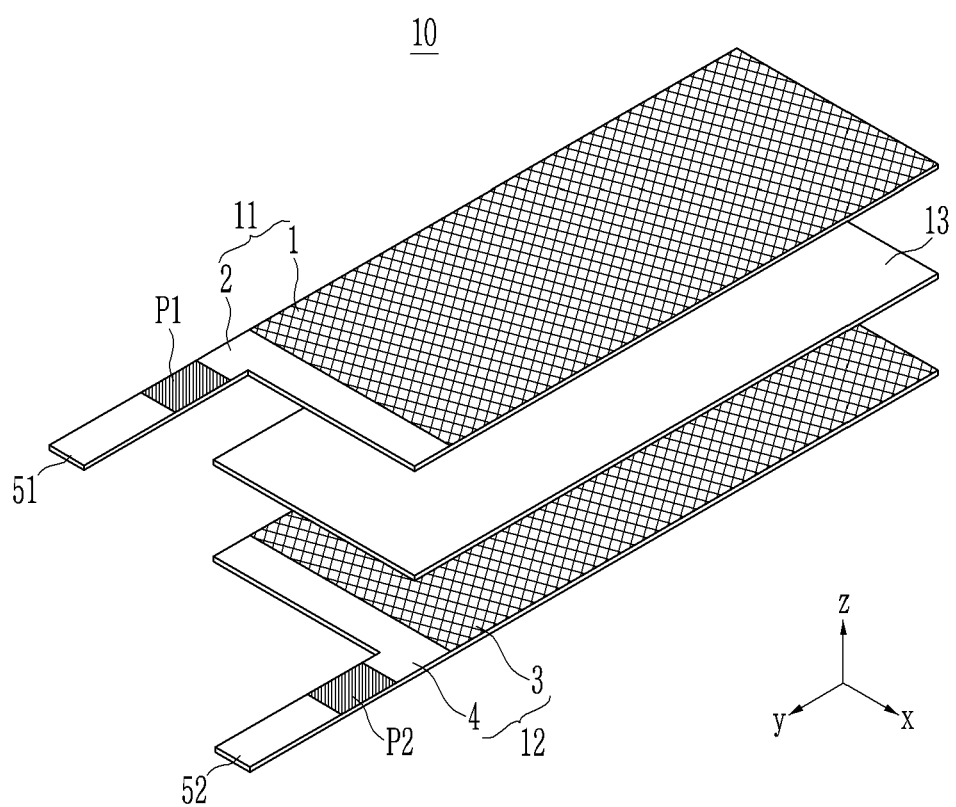
FIG. 1 is an exploded perspective view of an electrode assembly for a rechargeable battery according to an exemplary embodiment of the present disclosure.

100: rechargeable battery
10: electrode assembly for a rechargeable battery
1: first coating part
2: first uncoated region
3: second coating part
4: second uncoated region
11: first electrode
12: second electrode
13: separator
51: first electrode tab
52: second electrode tab
15: exterior member
P1: first stress buffering part
P2: second stress buffering part

DETAILED DESCRIPTION

The present invention will be described more fully herein with reference to the accompanying drawings, in which some exemplary embodiments of the invention are shown. As those skilled in the art would realize, however, the described embodiments may be modified in various different ways, all without departing from the spirit or scope of the present invention.

In the drawings and this specification, parts or elements that are not related to the description hereof may be omitted in order to clearly describe the present invention, and the same or like constituent elements are designated by the same reference numerals throughout the specification.

In addition, the size and thickness of each configuration shown in the drawings may be arbitrarily shown for better understanding and ease of description, but the present invention is not limited thereto.

In addition, unless explicitly described to the contrary, the word "comprise" and variations, such as "comprises" or "comprising," will be understood to imply the inclusion of stated elements but not the exclusion of any other elements.

It is to be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section described below could be termed a second element, component, region, layer, or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It is to be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

It is to be understood that when an element or layer is referred to as being "on," "connected to," or "coupled to" another element or layer, it can be directly on, connected to, or coupled to the other element or layer, or one or more intervening elements or layers may be present. In addition, it is also to be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which the present invention belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
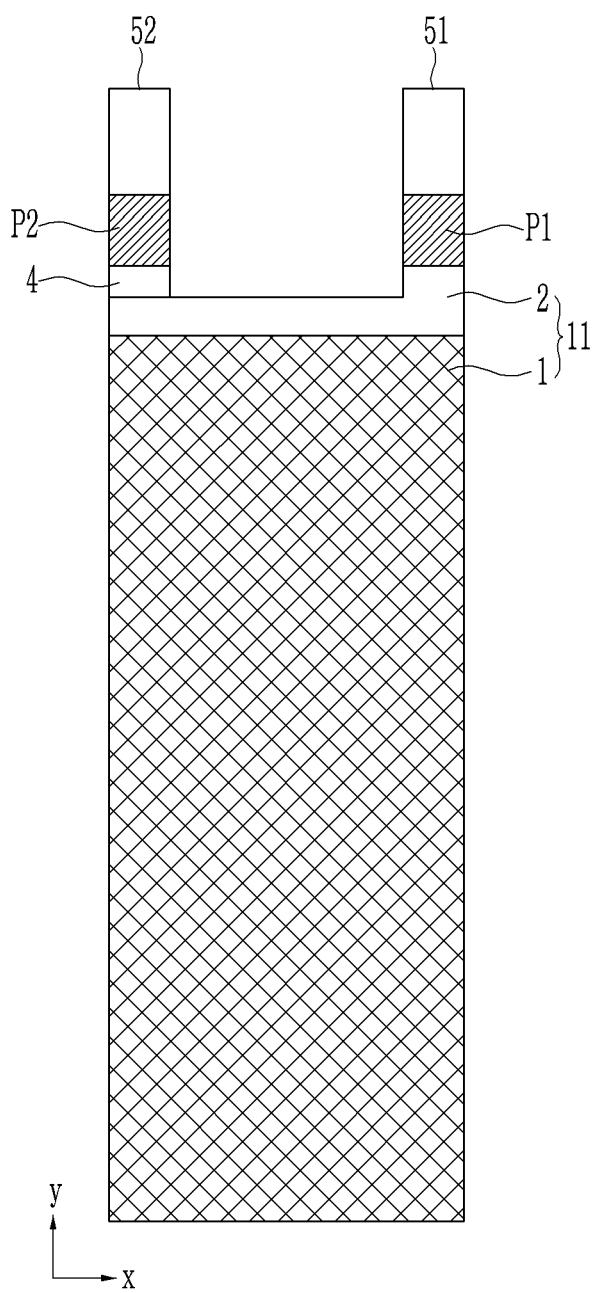
FIG. 2 is a plan view of the electrode assembly for a rechargeable battery shown in FIG. 1.

FIG. 1 is an exploded perspective view of an electrode assembly for a rechargeable battery according to an exemplary embodiment of the present disclosure; and FIG. 2 is a plan view of the electrode assembly for a rechargeable battery shown in FIG. 1.

Referring to FIG. 1 and FIG. 2, an electrode assembly for a rechargeable battery 10 according to an exemplary embodiment of the present disclosure includes a first electrode 11, a second electrode 12, and a separator 13 interposed between the first electrode 11 and the second electrode 12.

The electrode assembly 10, for example, may be configured as a stacked structure by sequentially stacking and disposing the first electrode 11 and the second electrode 12 of a rectangular sheet shape with the separator 13 interposed therebetween.

FIG. 1 and FIG. 2 show only one first electrode 11 and one second electrode 12 for convenience; however a plurality of first electrodes 11 and second electrodes 12 may be stacked via separators 13 interposed therebetween to configure the electrode assembly 10.

Also, in the present disclosure, polarities of the first electrode 11 and the second electrode 12 are not particularly limited. That is, the first electrode 11 may be a positive electrode and the second electrode 12 may be a negative electrode, or the first electrode 11 may be the negative electrode and the second electrode 12 may be the positive electrode. Herein, an example in which the first electrode 11 is the positive electrode and the second electrode 12 is the negative electrode is described for convenience.

The separator 13 separates the first electrode 11 and the second electrode 12 and provides a passage for lithium ions, and any commonly used separator for a rechargeable battery may be used. That is, it is possible to use a separator 13 having excellent electrolyte solution wetting performance with low resistance for ion movement in the electrolyte.

The separator 13 may be, for example, any one selected from a glass fiber, polyester, Teflon, polyethylene, polypropylene, polytetrafluoroethylene (PTFE), and combinations thereof, and may also be a non-woven fabric or woven fabric type. Further, a separator coated with a ceramic component or a polymer material to secure mechanical strength or heat resistance may be used, optionally in a single-layer or multi-layer structure.

The first electrode 11 includes a positive electrode current collector made of a metal thin plate having electrical conductivity, and a first coating part 1 where a positive electrode active material is coated on at least one surface of the positive electrode current collector. In this case, the positive electrode active material is not entirely coated on at least one surface of the positive electrode current collector.

That is, a first uncoated region 2 is disposed on at least one side of the first coating part 1. The first uncoated region 2 includes all of a region where the positive electrode active material is not coated, that is, a region where the positive electrode current collector is exposed, and a region integrally formed with a region where the positive electrode current collector is exposed and acting as the first electrode tab 51 among at least one surface of the positive electrode current collector. Accordingly, the first electrode tab 51 is made of the same material as the positive electrode current collector.

Resultantly, the first electrode 11 includes the first coating part 1 on which the positive electrode active material is coated and the first uncoated region 2 disposed on at least one side of the first coating part 1, and a region where the positive electrode active material is coated. In this case, the first uncoated region 2 is divided into a positive electrode current collector region where the first coating part 1 is not formed to be exposed, and a region integrally connected to the positive electrode current collector and functioning as a first electrode tab 51.

The first electrode tab 51 may electrically connect the first electrode 11 to an outer terminal.

The positive electrode current collector, for example, may be made as a mesh type or a metal foil type. Also, as the positive electrode current collector, for example, aluminum or an aluminum alloy may be used.

The first coating part 1, for example, may be formed of a material including at least one of a metal selected from cobalt, manganese, and nickel, a lithium transition metal oxide such as lithium cobalt oxide, lithium nickel oxide, lithium nickel cobalt oxide, lithium nickel cobalt aluminum oxide, lithium nickel cobalt manganese oxide, lithium manganese oxide, and lithium phosphate oxide, nickel sulfide, copper sulfide, sulfur, iron oxide, vanadium oxide, and combinations thereof, and composite oxides with lithium, but is not limited thereto.

The second electrode 12 includes a negative electrode current collector made of a metal thin plate having electrical conductivity, and a second coating part 3 where a negative active material formed on at least one surface of the negative electrode current collector is coated. In this case, the negative active material is not entirely coated on at least one surface of the negative electrode current collector.

That is, a second uncoated region 4 is disposed on at least one side of the second coating part 3.

The second uncoated region 4 includes all of a region where the negative active material is not coated, that is, a region where the negative electrode current collector is exposed among at least one surface of the negative electrode current collector, and a region integrally formed with the region where the negative electrode current collector is exposed and acting as a second electrode tab 52. Accordingly, the second electrode tab 52 is made of the same material as the negative electrode current collector.

Resultantly, the second electrode 12 includes the second coating part 3 where the negative active material is coated, and the second uncoated region 4 as a region which is formed on at least one side of the second coating part 3 and where the negative active material is not coated. In this case, the second uncoated region 4 is divided into the negative electrode current collector region exposed without coating the second coating part 3, and the second electrode tab 52 integrally connected to the negative electrode current collector.

The second electrode tab 52 may electrically connect the second electrode 12 to an outer terminal.

The negative electrode current collector, for example, may be made as a mesh type or a metal foil type. Also, as the negative electrode current collector, for example, copper, a copper alloy, etc. may be used.

The second coating part 3, for example, may be formed including at least one among a carbon material such as crystalline carbon, amorphous carbon, a carbon composite, a carbon fiber, etc., a lithium metal, a metal oxide, and lithium alloys, but is not limited thereto.

In the state that the first electrode 11 and the second electrode 12 are stacked with the separator 13 interposed therebetween, the first electrode tab 51 and the second electrode tab 52 may be alternately arranged at both sides in the width direction (an x-axis direction) of the electrode assembly 10. For example, in FIG. 2, the first electrode tab 51 may be disposed at the right side in the width direction (the x-axis direction) of the electrode assembly 10, and the second electrode tab 52 may be disposed to be spaced apart from the first electrode tab 51 by an interval (e.g., a predetermined interval) on the left side in the width direction (the x-axis direction) of the electrode assembly 10.

In the electrode assembly 10 according to embodiments of the present disclosure, a first stress buffering part P1 is disposed on at least a partial region of the first uncoated region 2. Also, in embodiments, a second stress buffering part P2 is disposed on at least a partial region of the second uncoated region 4.

In FIG. 2, the first stress buffering part P1 is disposed on the first uncoated region 2 and is spaced apart from the first coating part 1 by an interval (e.g., a predetermined interval), and the second stress buffering part P2 is disposed on the second uncoated region 4 and is spaced apart from the second coating part 3 by an interval (e.g., a predetermined interval).

That is, in an embodiment, the first stress buffering part P1 is disposed at the part of the region functioning as the first electrode tab 51 among the first uncoated region 2, and the second stress buffering part P2 is disposed at the part of the region functioning as the second electrode tab 52 among the second uncoated region 4.

Although not shown, the electrode assembly of the present disclosure may include only one of the first stress buffering part and the second stress buffering part. However, in the present exemplary embodiment having improved durability of the rechargeable battery, the electrode assembly 10 includes both of the first stress buffering part P1 and the second stress buffering part P2.

In further detail, the first stress buffering part P1 and the second stress buffering part P2 may be configured of a film including an ethylene propylene copolymer, a hydrogenated hydrocarbon polymer, and a polyethylene, respectively.

In this case, the film configuring the first stress buffering part P1 and the second stress buffering part P2, for example, may include 35 to 45 wt % of the ethylene propylene copolymer, 35 to 45 wt % of the hydrogenated hydrocarbon polymer, and 10 to 25 wt % of the polyethylene for the entire film.

In an embodiment, the film may have adherence in a range of 80° C. to 200° C., and, in an embodiment, in a range of 170° C. to 190° C. Accordingly, by applying heat to the film with the above-described range to be melted and coating and cooling the film to at least a partial region of the first uncoated region 2 and at least a partial region of the second uncoated region 4, the first stress buffering part P1 and the second stress buffering part P2 may be formed.

In general, when a conventional rechargeable battery with a flexible characteristic is repeatedly bent, uncoated regions may be easily damaged since a compressive stress and a tensile stress are continuously applied to the uncoated regions respectively connected to a negative electrode and a positive electrode, thereby having a function of electrically connecting the negative electrode and the positive electrode to an outer terminal. When the uncoated region is damaged in this way, an internal short circuit may occur due to direct contact of the positive and negative electrodes.

Also, since the adherence may not be maintained in the electrolyte solution in the uncoated regions, the internal short circuit may be generated by the direct contact of the positive electrode and the negative electrode.

However, in the present disclosure, as described above, by respectively disposing the first stress buffering part P1 and the second stress buffering part P2 in at least a partial region of the first uncoated region 2 and at least a partial region of the second uncoated region 4, when applying the electrode assembly 10 according to the present disclosure to a rechargeable battery having a flexible characteristic, the above-described problems may be avoided.

That is, by applying the electrode assembly 10 according to the present disclosure to the rechargeable battery having the flexible characteristic, despite the excellent flexibility and the repeated bending, the electrode tab region having the function of electrically connecting each electrode to the outer terminal among the uncoated region may be prevented or substantially prevented from being damaged, thereby remarkably improving the durability.

Figure 3:
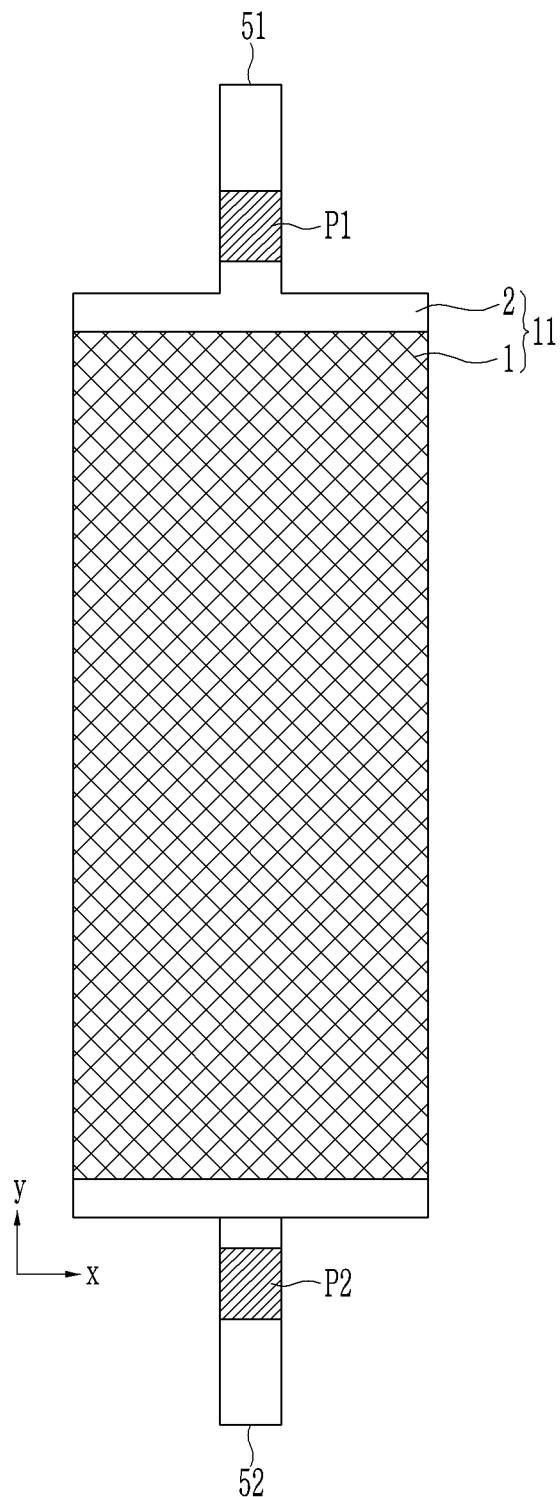
FIG. 3 is a view showing an exemplary variation of an electrode assembly of which positions of a first electrode tab and a second electrode tab shown in FIG. 2 are changed.

FIG. 3 is a view showing an exemplary variation of an electrode assembly of which position of a first electrode tab and a second electrode tab are changed from that shown in FIG. 2.

Referring to FIG. 3, in the electrode assembly 10 according to an embodiment of the present disclosure, the first and second electrode tabs 51 and 52 may be disposed to face each other in the length direction (a y-axis direction) of the electrode assembly 10. That is, the first electrode tab 51 may be disposed at one side of the length direction (the y-axis direction) of the electrode assembly 10, and the second electrode tab 52 may be disposed at the other side of the length direction (the y-axis direction) of the electrode assembly 10.

Other configurations except for the location of the first electrode tab 51 and the second electrode tab 52 in this exemplary variation may be the same as the configurations of the electrode assembly according to the above-described exemplary embodiment described with reference to FIG. 1 and FIG. 2, and further description thereof will be omitted here.

Figure 4:
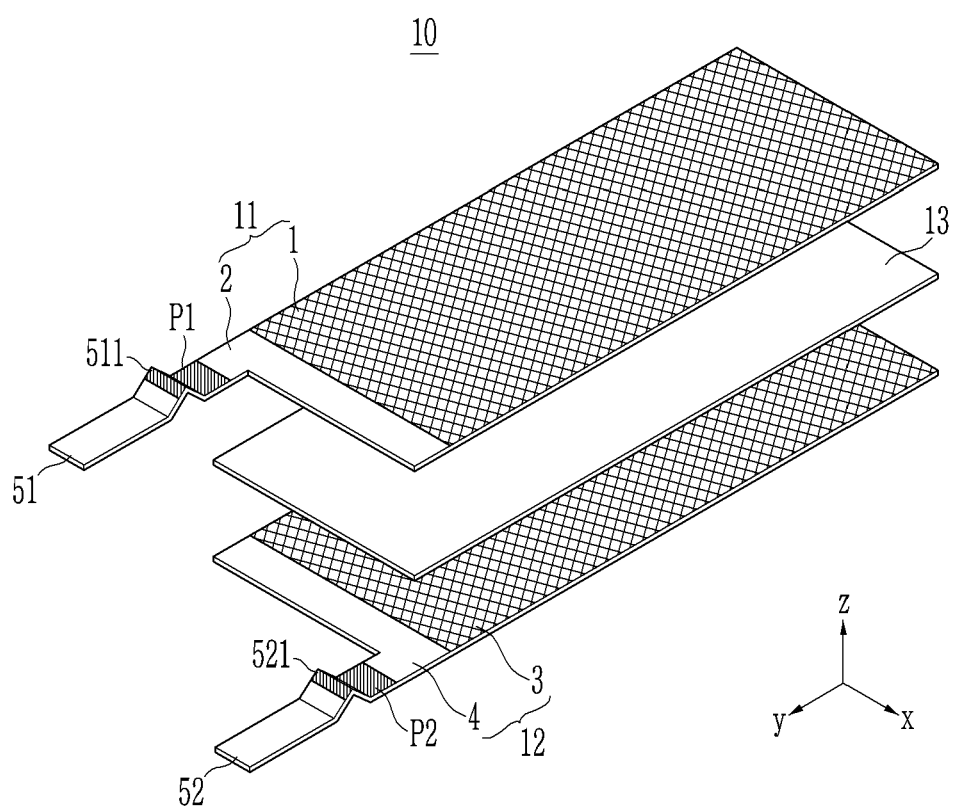
FIG. 4 is a view showing an exemplary variation of an electrode assembly of which a shape of a first electrode tab and a second electrode tab shown in FIG. 1 is changed.

FIG. 4 is a view showing an exemplary variation of an electrode assembly of which a shape of a first electrode tab and a second electrode tab is changed from that shown in FIG. 1.

Referring to FIG. 4, in the electrode assembly 10 according to an embodiment of the present disclosure, the first and second electrode tabs 51 and 52 may include bending parts 511 and 521 that are bent in the length direction thereof. As the bending parts 511 and 521 are included in the first and second electrode tabs 51 and 52, they may be structurally resilient, and, accordingly, the first and second electrode tabs 51 and 52 and lead tabs (not shown) may be more stably connected.

In this case, as shown in FIG. 4, the first and second stress buffering parts P1 and P2 may overlap the bending parts 511 and 521, or may be formed to not overlap the bending parts 511 and 521, and it is not particularly limited thereto.

Other configurations except for the first electrode tab 51 and the second electrode tab 52 including the bending parts 511 and 521 in this exemplary variation may be the same as the configurations of the electrode assembly according to the above-described exemplary embodiment described with reference to FIG. 1 and FIG. 2, and further description thereof will be omitted here.

Figure 5:
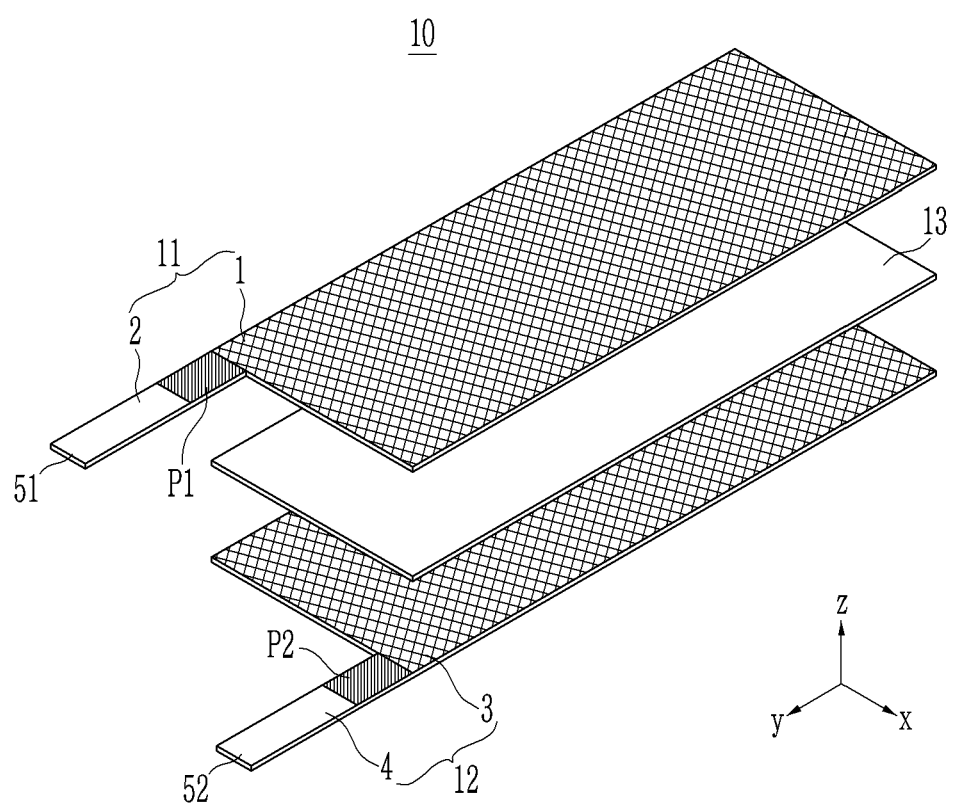
FIG. 5 is an exploded perspective view of an electrode assembly for a rechargeable battery according to another exemplary embodiment of the present disclosure.
Figure 6:
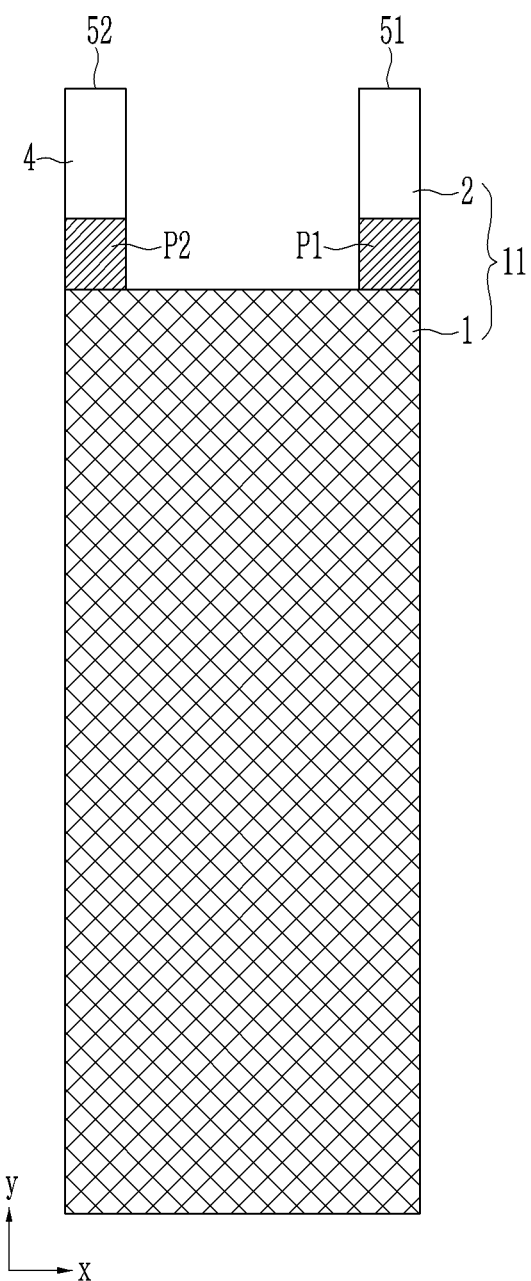
FIG. 6 is a plan view of the electrode assembly for a rechargeable battery shown in FIG. 5.

FIG. 5 is an exploded perspective view of an electrode assembly for a rechargeable battery according to another exemplary embodiment of the present disclosure; and FIG. 6 is a plan view of the electrode assembly for a rechargeable battery shown in FIG. 5.

In the present exemplary embodiment, the description of the same configurations as those described above in FIG. 1 to FIG. 4 will be omitted and different configurations will be described.

Referring to FIG. 5 and FIG. 6, in the present exemplary embodiment, the first stress buffering part P1 is disposed on the first uncoated region 2, and one side of the first stress buffering part P1 is disposed to be in contact with the first coating part 1.

In further detail, in the present exemplary embodiment, the first coating part 1 is entirely disposed on at least one surface of the positive electrode current collector, and does not include a region where the positive electrode active material is not coated and where the positive electrode current collector is exposed. Also, the first stress buffering part P1 is disposed at the first uncoated region 1 functioning as the first electrode tab 51, and may be formed of a shape extending to the region in contact with the first coating part 1.

Further, in an embodiment, the second coating part 3 is entirely disposed on at least one surface of the negative electrode current collector, and does not include the region where the negative active material is not coated and where the negative electrode current collector is exposed. Also, in an embodiment, the second stress buffering part P2 is disposed at the second uncoated region 3 functioning as the second electrode tab 52, and may be formed of a shape extending to the region in contact with the second coating part 3.

Accordingly, in the present exemplary embodiment, each area of the first and second stress buffering parts P1 and P2 may be formed to be wider than each area of the first and second stress buffering parts P1 and P2 of the electrode assembly according to the exemplary embodiment described with reference to FIG. 1 and FIG. 2.

When the first and second stress buffering parts P1 and P2 are formed as shown in the present exemplary embodiment, the durability of the electrode assembly for the rechargeable battery 10 may be further improved.

Figure 7:
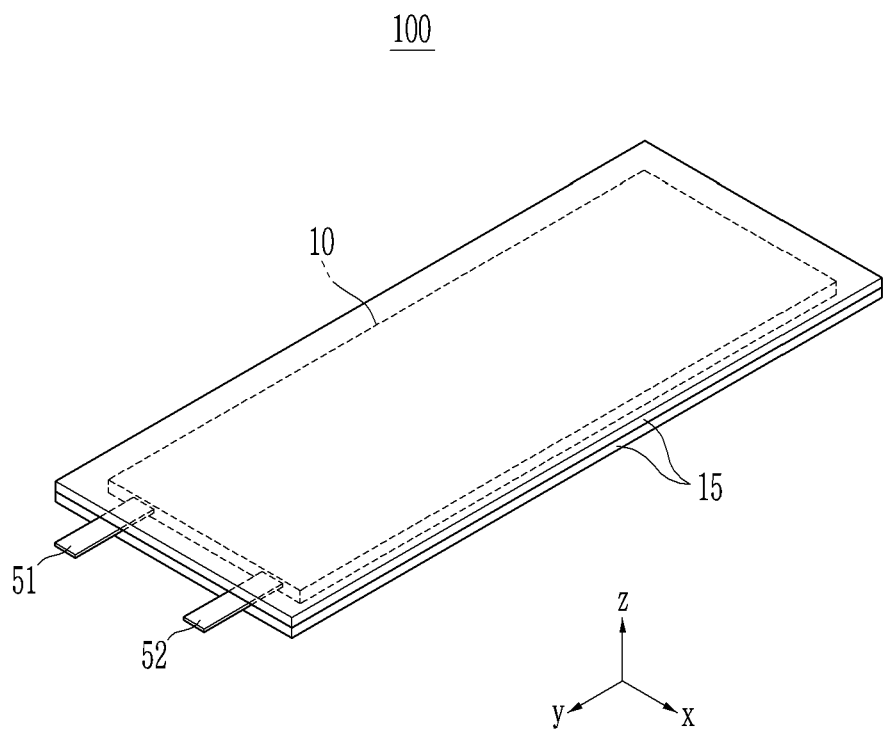
FIG. 7 is a perspective view of a rechargeable battery according to an exemplary embodiment of the present disclosure.
Figure 8:
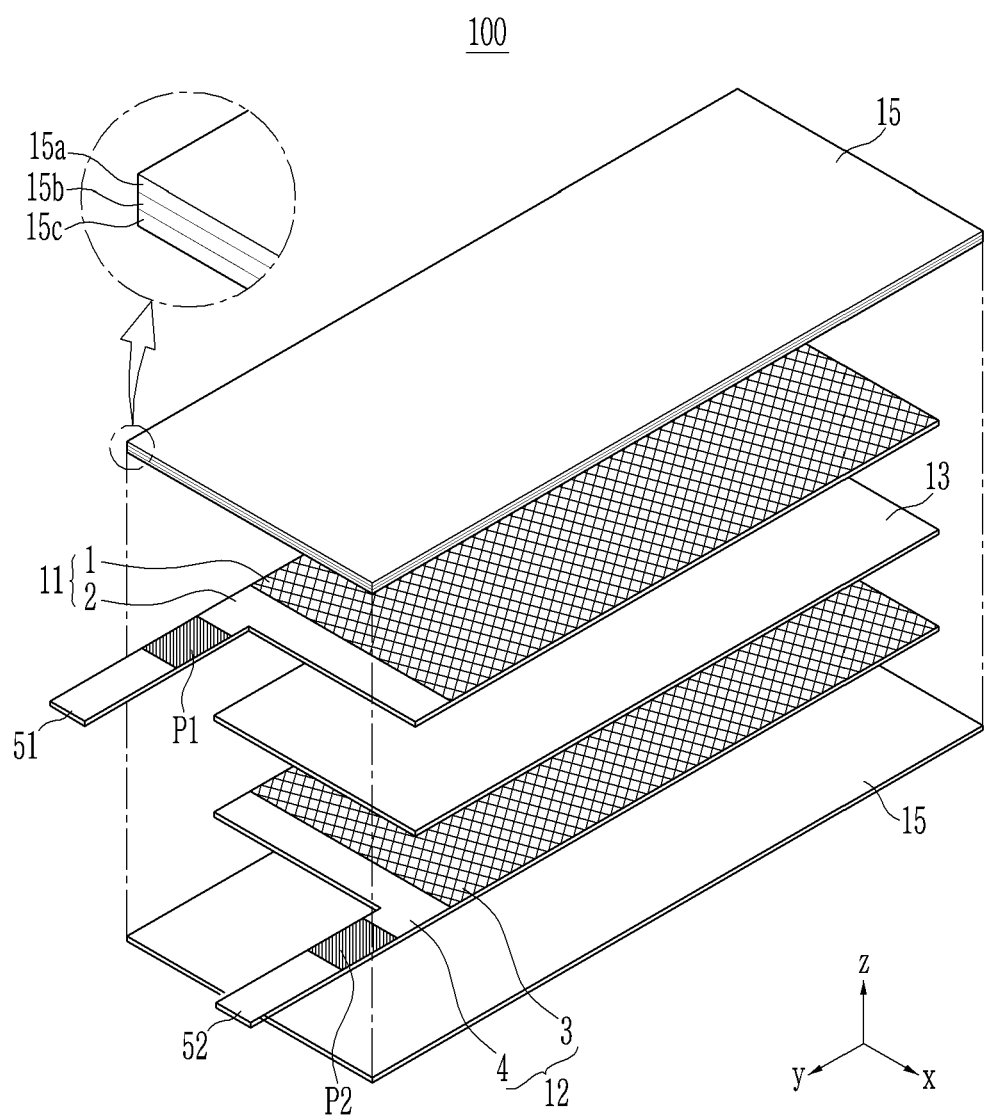
FIG. 8 is an exploded perspective view of the rechargeable battery according to FIG. 7.

FIG. 7 is a perspective view of a rechargeable battery according to an exemplary embodiment of the present disclosure; and FIG. 8 is an exploded perspective view of the rechargeable battery according to FIG. 7.

Referring to FIG. 7 and FIG. 8, a rechargeable battery 100 according to the present exemplary embodiment may have one form among the above-described electrode assemblies 10, and includes an exterior member 15 receiving the electrode assembly 10 and having flexibility. FIG. 8 shows the electrode assembly described with reference to FIG. 1 and FIG. 2 as an example. In addition, the electrode assembly described with reference to any of FIG. 3, FIG. 4, FIG. 5, and FIG. 6 may be received in the exterior member 15.

The description for the electrode assembly 10 is the same as that with reference to FIG. 1 to FIG. 6 and is omitted here.

An electrolyte solution may be received along with the electrode assembly 10 in the exterior member 15.

The electrolyte solution may be made of a lithium salt such as $LiPF_6$ and $LiBF_4$ with an organic solvent such as ethylene carbonate (EC), propylene carbonate (PC), diethyl carbonate (DEC), ethyl methyl carbonate (EMC), and dimethyl carbonate (DMC). The electrolyte solution may be a liquid, a solid, or a gel.

In an embodiment, the electrode assembly 10 is received in a pair of exterior members 15 disposed at the top and bottom of the electrode assembly 10. At this time, the first electrode tab 51 and the second electrode tab 52 are formed to be drawn outside of the exterior member 15.

In the present exemplary embodiment, the first electrode tab 51 and the second electrode tab 52 may be received in the exterior member 15 after enclosing each of the parts in contact with the exterior member 15 with an insulating tape (not shown), etc.

Referring to FIG. 8, in an embodiment, a pair of exterior members 15 respectively include an outer resin layer 15a, a moisture barrier layer 15b, and an inner resin layer 15c sequentially stacked from the outside.

The outer resin layer 15a functions as a protection layer, and is disposed at the outermost of the rechargeable battery 100.

The outer resin layer 15a may be composed of at least one selected from a group consisting of, for example, polyethylene terephthalate, polybutylene terephthalate, polyethylene naphthalate, polybutylene naphthalate, copolymer polyester, polycarbonate, and nylon film, but is not limited thereto.

In an embodiment, the thickness of the outer resin layer 15a, for example, may be 10 μm to 100 μm, and, in an embodiment, in a range of 10 μm to 50 μm. When the thickness of the outer resin layer 15a is 10 μm or more, since physical properties are excellent, the outer resin layer 15a is not easily damaged, while when the thickness is 100 μm or less, in molding such as injection molding, forming is excellent, and when applied to the rechargeable battery 100, it is possible to secure excellent battery capacity per unit volume.

The moisture barrier layer 15b is disposed at a surface of the side of the outer resin layer 15a where the electrode assembly 10 is disposed. The moisture barrier layer 15b is an intermediate layer that acts as a barrier layer to prevent or substantially prevent leakage of an electrolyte solution, penetration of moisture, or the like. The moisture barrier layer 15b may be formed of a thin plate member.

The moisture barrier layer 15b, for example, may be composed of aluminum or aluminum alloys.

In an embodiment, the thickness of the moisture barrier layer 15b, for example, may be 10 μm to 100 μm, and, in an embodiment, may be in a range of 10 μm to 50 μm or 10 μm to 30 μm. When the thickness of the moisture barrier layer 15b satisfies the above range, it is possible to effectively prevent leakage of the electrolyte solution and the penetration of moisture from the outside.

The inner resin layer 15c is disposed at a surface of the moisture barrier layer 15b, and is disposed at a surface opposite to the surface where the outer resin layer 15a is disposed. In addition, the inner resin layer 15c may have an insulating and thermal fusion function.

The inner resin layer 15c may be formed of, for example, a polyolefin, or a copolymer of a polyolefin, and, in an embodiment, the polyolefin may be composed of polyethylene (PE) or polypropylene (PP), but is not limited thereto.

In an embodiment, the thickness of the inner resin layer 15c may be 10 μm to 100 μm, and, in an embodiment, in a range of 20 μm to 50 μm. When the maximum thickness of the inner resin layer 15c satisfies the above range, moldability, adhesiveness, and chemical resistance are excellent.

The electrode assembly 10 may be disposed inside a pair of exterior members 15 and a gasket may be interposed on the edges thereof to seal the pair of exterior members 15, and the inner resin layers 15c may be mutually fused without an additional gasket to be sealed.

Figure 9:
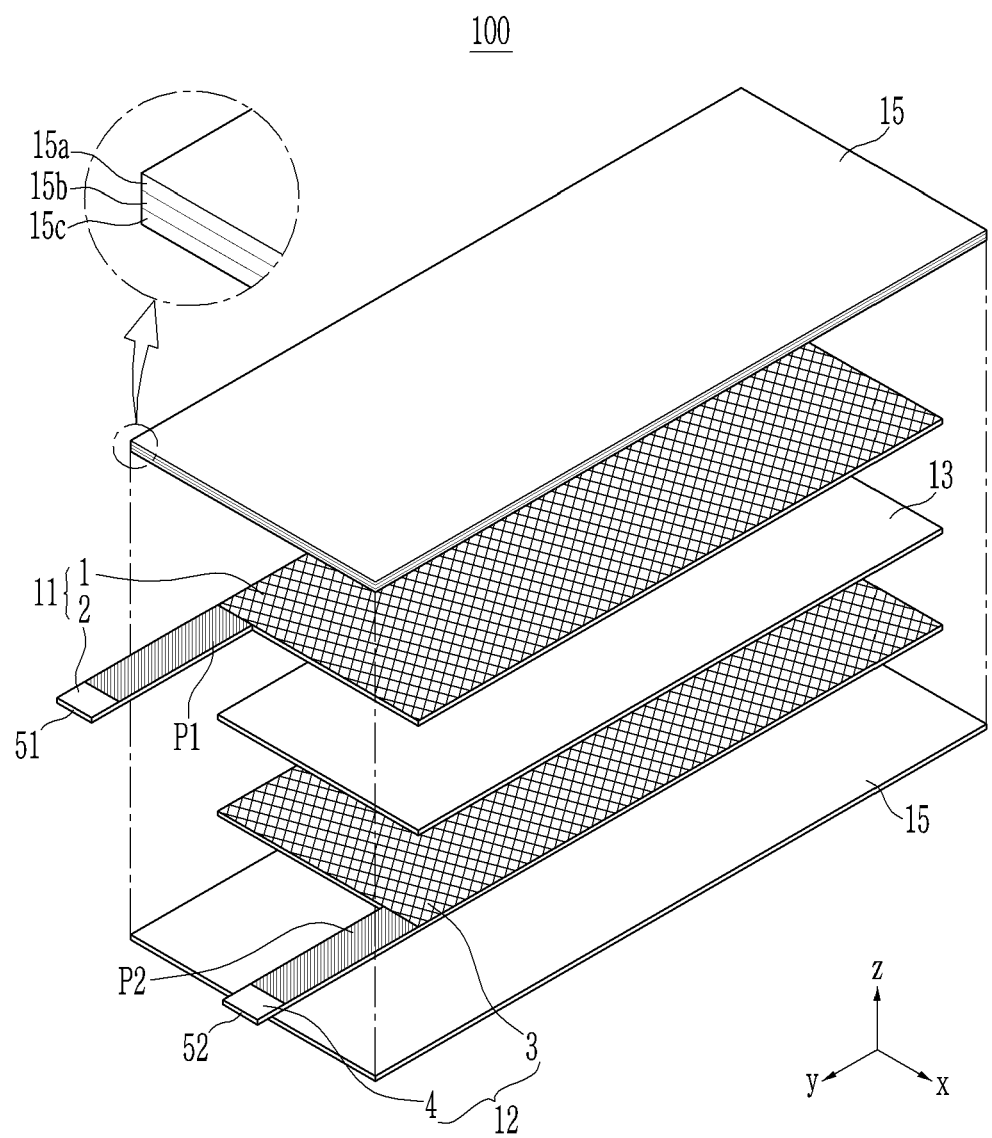
FIG. 9 is an exploded perspective view of a rechargeable battery according to another exemplary embodiment of the present disclosure.

FIG. 9 is an exploded perspective view of a rechargeable battery according to another exemplary embodiment of the present disclosure. In the present exemplary embodiment, the same configurations as those described in FIG. 7 and FIG. 8 are omitted and differences are described.

Referring to FIG. 9, in the electrode assembly 10 included in the rechargeable battery 100 according to the present exemplary embodiment, at least one of the first stress buffering part P1 and the second stress buffering part P2 may be formed to be extended to the region in contact with the part among the edge of a pair of exterior members 15.

FIG. 9 shows an example in which the first stress buffering part P1 and the second stress buffering part P2 are formed to be extended to the region in contact with the part among the edge of the exterior member 15 in the electrode assembly of FIG. 5. Accordingly, even if the electrode assembly described with reference to FIG. 2 to FIG. 4 is received, the first stress buffering part P1 and the second stress buffering part P2 may be formed to be extended to the region in contact with the part among the edge of the exterior member 15.

In this case, in the process of receiving the electrode assembly 10 to the exterior member 15, since the insulating tape is not covered to the part with which the first and second electrode tabs 51 and 52 are in contact with the exterior member 15, productivity is improved.

Next, the present invention is described in further detail through some exemplary embodiments.

Exemplary Embodiment 1

A plurality of positive electrodes, negative electrodes, and separators of a rectangular sheet shape are prepared.

In this case, the positive electrode tab and the negative electrode tab are integrally formed in the positive uncoated region and the negative uncoated region.

A film A is melted by heating to 175° C. and applied to the part of the uncoated region (the tab portion) spaced apart from the coating part of each electrode by a predetermined interval to manufacture the positive electrode and the negative electrode in which the first stress buffering part and the second stress buffering part are formed with the shape like in FIG. 1.

Then, a plurality of stacked electrode assemblies is fabricated by interposing the separator between the positive electrode and the negative electrode.

The electrode assembly is disposed between a pair of exterior members, and the edges of the exterior members are sealed to manufacture the rechargeable battery.

Comparative Example 1

A film B to be melted by heating to 175° C. as the film to be used as the first stress buffering part and the second stress buffering part is prepared.

Comparative Example 2

A film C to be melted by heating to 175° C. as the film to be used as the first stress buffering part and the second stress buffering part is prepared.

Comparative Example 3

A film D to be melted by heating to 175° C. as the film to be used as the first stress buffering part and the second stress buffering part is prepared.

Comparative Example 4

A film E to be melted by heating to 175° C. as the film to be used as the first stress buffering part and the second stress buffering part is prepared.

Comparative Example 5

A film F to be melted by heating to 175° C. as the film to be used as the first stress buffering part and the second stress buffering part is prepared.

Comparative Example 6

After respectively connecting the positive electrode tab and the negative electrode tab to the positive uncoated region and the negative uncoated region by welding, the rechargeable battery is manufactured by the same method as in Exemplary Embodiment 1 except for not forming the first and second stress buffering parts.

The composition of the film A to the film F used in Exemplary Embodiment 1 and Comparative Examples 1 to 5 is shown in Table 1 below.

TABLE 1

| Divisions | Configuration |
|---|---|
| Film A | polyolefin film (ethylene propylene copolymer 40 wt % + hydrogenated hydrocarbon polymer 40 wt % + polyethylene 20 wt %) |
| Film B | polyamide film |
| Film C | polyester film |
| Film D | polyurethane film |
| Film E | polyolefin film (ethylene propylene copolymer 50 wt % + hydrogenated hydrocarbon polymer 40 wt % + polyethylene 10 wt %) |
| Film F | polyolefin film (ethylene propylene copolymer 50 wt % + hydrogenated hydrocarbon polymer 50 wt %) |

Experimental Example 1—Adhesion Test

An adhesion test is performed for the film A to the film F prepared in Exemplary Embodiment 1 and Comparative Examples 1 to 5.

In the adhesion test, an aluminum foil of an 80 mm×20 mm size and the film A to the film F used in Exemplary Embodiment 1 and Comparative Examples 1 to 5 are prepared, and then the aluminum foil and one end of each film are adhered to each other by heating and each other end that is not adhered is fixed to a tension tester (HT400 of Tinius Olsen company).

Then, the aluminum foil that is not attached by heating and the end of each film are pulled in different directions at a predetermined speed to measure the adhesion.

TABLE 2

| Divisions | Adhesion (N/mm) |
|---|---|
| Exemplary Embodiment 1 | 0.826 |
| Comparative Example 1 | 0.219 |
| Comparative Example 2 | 0.256 |
| Comparative Example 3 | 0.401 |
| Comparative Example 4 | 0.662 |
| Comparative Example 5 | 0.531 |

Referring to Table 2, in the case of using the film A in Exemplary Embodiment 1, when comparing the case with the film B to the film F used in Comparative Examples 1 to 5, it may be confirmed that the adhesion with the aluminum foil is remarkably excellent.

Experimental Example 2—Tension Test

A tension test is executed for the film A to the film F prepared in Exemplary Embodiment 1 and Comparative Examples 1 to 5.

A sample of which the aluminum foil of the predetermined size and each of the film A to the film F used in Exemplary Embodiment 1 and the Comparative Examples 1 to 5 are adhered is prepared. In the case of Comparative Example 6, a sample in which the film is only made of the aluminum foil is prepared.

Next, the tension test is executed by using the tension tester (HT400 of Tinius Olsen company) for each sample.

As a tension test result, for other samples except for the sample in which the film A used in Exemplary Embodiment 1 is adhered to be manufactured, breaking-off of the aluminum foil and the film are not all simultaneously executed, but the breaking-off of the aluminum foil is firstly generated and then the film is broken off. This means that the adhesion is not sufficiently executed such that the film does not sufficiently delay the breaking-off of the aluminum foil; thus, it is difficult to obtain elongation rate and elastic deformation rate data.

Accordingly, only the tension test results for Exemplary Embodiment 1 and Comparative Example 6 are shown in Table 3 below.

TABLE 3

| Divisions | Elongation rate (%) | Elastic deformation rate (%) |
|---|---|---|
| Exemplary Embodiment 1 | 6.3 | 0.85 |
| Comparative Example 6 | 1.1 | 0.58 |

For the sample manufactured by adhering the film A used in Exemplary Embodiment 1 having the best adhesion, as the tension test result, the breaking-off of the aluminum foil and the film A are simultaneously generated, which means that the film A maximally delays the breaking-off of the aluminum foil with sufficient adhesion.

Also, referring to Table 3, in the case of the sample to which the film A used in Exemplary Embodiment 1 is adhered, like Comparative Example 6, when compared with the tension test result for the sample made only of the aluminum foil without the stress buffering part, it may be confirmed that the elongation rate and the elastic deformation rate are remarkably improved.

Experimental Example 3—Bending Test

For the rechargeable battery according to Exemplary Embodiment 1 and the Comparative Example 6, the performance of the rechargeable battery before and after executing the bending test is measured.

(1) Number of bends possible to maintain a capacity maintaining rate of 90% or more.

For the rechargeable battery according to Exemplary Embodiment 1 and Comparative Example 6, after executing the charging and discharging at a 0.5 C. rate, the bending number in which it is possible to maintain a capacity maintaining rate of 90% or more is measured and shown in Table 4.

TABLE 4

| Divisions | Bending number |
| --- | --- |
| Exemplary Embodiment 1 | 20,000 times or more |
| Comparative Example 6 | 1000 times or less |

(2) Discharge capacity and capacity maintaining rate according to bending number.

The discharge capacity and the capacity maintaining rate according to the bending number were respectively measured and are shown in Table 5 below.

TABLE 5

| | 0 times Discharge capacity (mAh) | 1000 times | | 20,000 times | | 50,000 times | |
| --- | --- | --- | --- | --- | --- | --- | --- |
| Divisions | | Discharge capacity (mAh) | Capacity maintaining rate (%) | Discharge capacity (mAh) | Capacity maintaining rate (%) | Discharge capacity (mAh) | Capacity maintaining rate (%) |
| Exemplary Embodiment 1 | 37.2 | 37.0 | 99.5 | 36.8 | 98.8 | 30.2 | 81.2 |
| Comparative Example 6 | 39.4 | 19.7 | 50 | Measuring impossible | | Measuring impossible | |

Referring to Table 4 and Table 5, in the case of the lithium secondary battery according to Exemplary Embodiment 1 in which the film A including an ethylene propylene copolymer, a hydrogenated hydrocarbon polymer, and a polyethylene with the described content is applied as the first and second stress buffering parts, when compared with the lithium secondary battery according to Comparative Example 6 without the first and second stress buffering parts, it may be confirmed that the excellent bending characteristic is obtained and simultaneously the excellent capacity maintaining rate appears.

While the present invention has been described in connection with what are presently considered to be some practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly for a rechargeable battery, the electrode assembly comprising:
a first electrode comprising a first coating part and a first uncoated region at at least one side of the first coating part, wherein a portion of the first uncoated region having a width less than that of other portions of the first electrode defines a first electrode tab;
a second electrode comprising a second coating part and a second uncoated region at at least one side of the second coating part, wherein a portion of the second uncoated region having a width less than that of other portions of the second electrode defines a second electrode tab;
a separator between the first electrode and the second electrode; and
at least one of a first stress buffering part on at least a partial region of the first electrode tab and a second stress buffering part on at least a partial region of the second electrode tab,
wherein the at least one of the first stress buffering part and the second stress buffering part is configured as a film comprising an ethylene propylene copolymer, a hydrogenated hydrocarbon polymer, and polyethylene.

2. The electrode assembly of claim 1, wherein the film, based on the entire film, includes:
35 wt % to 45 wt % of the ethylene propylene copolymer;
35 wt % to 45 wt % of the hydrogenated hydrocarbon polymer; and
10 wt % to 25 wt % of polyethylene.

3. The electrode assembly of claim 1, wherein the film has adherence in a range of 80° C. to 200° C.

4. The electrode assembly of claim 1, wherein the first stress buffering part is on the first uncoated region and is spaced apart from the first coating part by an interval.

5. The electrode assembly of claim 4, wherein the second stress buffering part is on the second uncoated region and is spaced apart from the second coating part by an interval.

6. The electrode assembly of claim 1, wherein the first stress buffering part is on the first uncoated region, and a side of the first stress buffering part is in contact with the first coating part.

7. The electrode assembly of claim 6, wherein the second stress buffering part is on the second uncoated region, and a side of the second stress buffering part is in contact with the second coating part.

8. The electrode assembly of claim 1, wherein the first uncoated region is integral with the first electrode tab, and the second uncoated region is integral with the second electrode tab.

9. The electrode assembly of claim 8, wherein
the first electrode tab is at a side in a width direction of the electrode assembly, and
the second electrode tab is spaced apart in the width direction from the first electrode tab by an interval.

10. The electrode assembly of claim 8, wherein
the first electrode tab is at a side in a length direction of the electrode assembly, and
the second electrode tab is at an opposite side in the length direction of the electrode assembly.

11. The electrode assembly of claim 8, wherein at least one of the first electrode tab and the second electrode tab comprises a bending part that is bent in a length direction of the first electrode tab and the second electrode tab.

12. The electrode assembly of claim 1, wherein the first electrode and the second electrode are alternately stacked in plural with the separator therebetween.

13. A rechargeable battery comprising:
the electrode assembly of claim 1; and
an exterior member receiving the electrode assembly.

14. The rechargeable battery of claim 13, wherein the first stress buffering part is in contact with a part of an edge of the exterior member.

15. The rechargeable battery of claim 14, wherein the second stress buffering part is in contact with a part of the edge of the exterior member.

16. The rechargeable battery of claim 13, wherein the rechargeable battery has a flexible characteristic.

\* \* \* \* \*